United States Patent
Yamaoka et al.

(10) Patent No.: US 10,495,749 B2
(45) Date of Patent: Dec. 3, 2019

(54) RADAR VIDEO CREATION APPARATUS AND METHOD

(71) Applicant: Mitsubishi Electric Corporation, Chiyoda-ku (JP)

(72) Inventors: Tomoya Yamaoka, Chiyoda-ku (JP); Kei Suwa, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 205 days.

(21) Appl. No.: 15/554,868

(22) PCT Filed: Mar. 14, 2016

(86) PCT No.: PCT/JP2016/057960
§ 371 (c)(1),
(2) Date: Aug. 31, 2017

(87) PCT Pub. No.: WO2016/148104
PCT Pub. Date: Sep. 22, 2016

(65) Prior Publication Data
US 2018/0045825 A1 Feb. 15, 2018

(30) Foreign Application Priority Data
Mar. 16, 2015 (JP) ................................. 2015-051966

(51) Int. Cl.
*G01S 13/90* (2006.01)

(52) U.S. Cl.
CPC .................................... *G01S 13/90* (2013.01)

(58) Field of Classification Search
CPC .. G01S 13/90; G01S 13/9004; G01S 13/9019; G01S 13/9021; G01S 13/9027;
(Continued)

(56) References Cited

U.S. PATENT DOCUMENTS 5,243,349 A * 9/1993 Mims ...................... G01S 13/90
342/25 A
5,805,098 A 9/1998 McCorkle
(Continued)

FOREIGN PATENT DOCUMENTS

JP 2009-225948 A 10/2009
JP 2010-148135 A 7/2010
(Continued)

OTHER PUBLICATIONS

Sato, H., et al., "Evaluation of SAR Image Processing using GPUs", the Institute of Electronics, Information and Communication Engineers Information and Systems Society, Human Communication, Sep. 7, 2011. pp. 335-336.
(Continued)

*Primary Examiner* — Peter M Bythrow
*Assistant Examiner* — Michael W Justice
(74) *Attorney, Agent, or Firm* — Oblon, McClelland, Maier & Neustadt, L.L.P.

(57) ABSTRACT

There are provided an azimuth Fourier transform unit that transforms a SAR image into components in a Doppler frequency band, a band cutting-out unit that cuts out sub-band components from the components in the Doppler frequency band, and an azimuth inverse Fourier transform unit that transforms the sub-band components into sub-images, respectively. An image reconstructing unit extracts, for each area irradiated with a beam, a pixel sequence corresponding to the irradiated area from each of the sub-images, and collects the plurality of extracted pixel sequences to construct images for video.

8 Claims, 10 Drawing Sheets

(58) Field of Classification Search
CPC ............... G01S 13/904; G01S 13/9054; G01S 13/9056; G01S 13/9089
See application file for complete search history.

(56) References Cited

U.S. PATENT DOCUMENTS

| | | | |
|---|---|---|---|
| 6,222,933 B1* | 4/2001 | Mittermayer | G01S 13/904 382/109 |
| 6,781,541 B1* | 8/2004 | Cho | G01S 13/904 342/25 D |
| 7,498,968 B1* | 3/2009 | Bielek | G01S 13/9029 342/160 |
| 8,427,359 B1 | 4/2013 | Bickel et al. | |
| 9,146,312 B1* | 9/2015 | Rush | G01S 13/90 |
| 2011/0317756 A1 | 12/2011 | Fukata | |
| 2014/0266869 A1 | 9/2014 | Liu et al. | |

FOREIGN PATENT DOCUMENTS

| | | |
|---|---|---|
| JP | 2010-223811 A | 10/2010 |
| JP | 2011-247593 A | 12/2011 |
| JP | 2012-10263 A | 1/2012 |
| JP | 2013-137253 A | 7/2013 |
| JP | 2014-182124 A | 9/2014 |

OTHER PUBLICATIONS

Yan, H., et al., "Frame Rate Analysis of Video Synthetic Aperture Radar (ViSAR)", 2016 International Symposium on Antennas and Propagation (ISAP). pp. 446-447.
International Search Report dated May 31, 2016, in PCT/JP2016/057960, filed Mar. 14, 2016.
Japanese Office Action dated Sep. 20, 2016, in Japanese Patent Applicaton No. 2016-547959 filed Sep. 9. 2016 (with English Translation).
Japanese Final Office Action dated Feb. 7, 2017 in Japanese Patent Application No. 2016-547959 filed Sep. 9, 2016 (with English Translation).
Extended European Search Report dated Oct. 12, 2018 in Patent Application No. 16764934.2, 8 pages.
Sato, H. et al. "Evaluation of SAR Image Processing using GPUs" the Institute of Electronics, Information and Communication Engineers Information and Systems Society, Human Communication, XP009506221, Sep. 7, 2011, 3 Pages (submitting English translation only, previously filed Aug. 31, 2017).

\* cited by examiner

RADAR VIDEO CREATION APPARATUS AND METHOD

TECHNICAL FIELD

The present invention relates to a radar video creation apparatus and a radar video creation method for creating images for video from a synthetic aperture radar image (hereinafter, referred to as "SAR image").

BACKGROUND ART

Patent Literature 1 cited below discloses a radar video creation apparatus for creating images for video from raw data which is unprocessed data and observed by a radar apparatus in spotlight mode.

Patent Literature 1 describes as a conventional art a method in which, when raw data which is collected by a radar apparatus observing in spotlight mode is obtained, the raw data is divided into a plurality of pieces of partial raw data, and an image production process is performed on each piece of partial raw data, by which a plurality of partial SAR images are created, enabling to check changes in an observed area.

On the other hand, according to the invention described in Patent Literature 1, a process of extracting a plurality of pieces of partial raw data is performed by cutting out raw data with overlapping between pieces of partial raw data allowed, instead of by dividing raw data. SAR images obtained by performing such cutting-out of raw data and an image production process smoothly change, and thus, more detailed changes in a target can be checked.

CITATION LIST

Patent Literatures

Patent Literature 1: U.S. Pat. No. 7,498,968, "Synthetic aperture design for increased SAR Image rate"

SUMMARY OF INVENTION

Technical Problem

Since the conventional radar video creation apparatus is configured as described above, if raw data is provided from the radar apparatus on a moving platform, then images for video can be created. However, when a SAR image is provided from the radar apparatus without raw data being provided, creation of images for video from the SAR image cannot be performed. Therefore, there is a problem that it is not possible to satisfy, for example, a request to transmit, for the purpose of reducing the amount of communication, a SAR image which is obtained by, on the platform, performing an image production process on raw data obtained by the radar apparatus, instead of raw data with a large amount of data, to the radar video creation apparatus and create images for video from the SAR image, or a request to create images for video from a SAR image which is a product created in the past.

The invention is made to solve a problem such as that described above, and an object of the invention is to obtain a radar video creation apparatus and a radar video creation method that are capable of creating images for video from a SAR image.

Solution to Problem

A radar video creation apparatus according to the invention is provided with a processor to execute a program; and a memory to store the program which, when executed by the processor, performs processes of: transforming a synthetic aperture radar image into components in a Doppler frequency band, the synthetic aperture radar image being created from observed data of a radar apparatus; cutting out a plurality of series of sub-band components from the transformed components in the Doppler frequency band; respectively transforming the cut-out plurality of series of sub-band components into a plurality of time-domain images; extracting, for each area irradiated with a beam by the radar apparatus, a pixel sequence corresponding to the irradiated area from each of the transformed plurality of time-domain images, and collecting the plurality of extracted pixel sequences to construct images for video; and playing back the images for video in turn, the images for video being constructed for the respective areas irradiated with a beam, wherein the processor calculates from a bandwidth of the sub-band components an observation time difference between adjacent sub-band components, and determines a frame rate from an inverse of the observation time difference for use in playing back the images for video.

Advantageous Effects of Invention

According to the invention, there are provided the first transform unit that transforms a synthetic aperture radar image created from observed data of the radar apparatus, into components in a Doppler frequency band; the band cutting-out unit that cuts out a plurality of sub-band components from the components in the Doppler frequency band transformed by the first transform unit; and the second transform unit that transforms the plurality of sub-band components cut out by the band cutting-out unit into time-domain images, respectively, and the image reconstructing unit extracts, for each area irradiated with a beam by the radar apparatus, a pixel sequence corresponding to the irradiated area from each of the plurality of time-domain images transformed by the second transform unit, and collects the plurality of extracted pixel sequences to construct video images. Thus, there is an advantageous effect of being able to create video images from a synthetic aperture radar image.

DESCRIPTION OF EMBODIMENTS

To describe the invention in more detail, modes for carrying out the invention will be described below with reference to the accompanying drawings.

Embodiment 1

Figure 1:
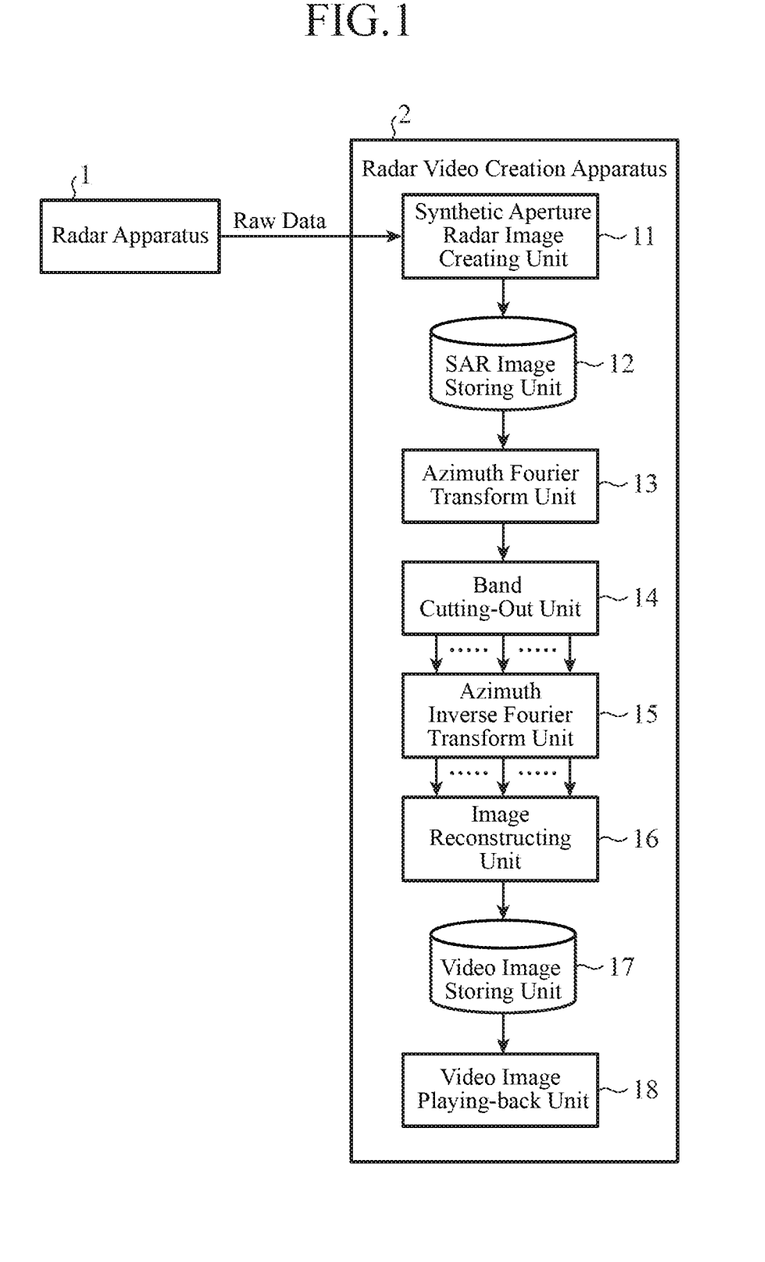
FIG. 1 is a configuration diagram showing a radar video creation apparatus according to Embodiment 1 of the invention.

FIG. 1 is a configuration diagram showing a radar video creation apparatus according to Embodiment 1 of the invention.

In FIG. 1, a radar apparatus 1 is a radar that performs observation in stripmap mode or sliding spotlight mode. For example, the radar apparatus 1 irradiates a target on the Earth's surface with a beam and then receives echoes from the target and generates, for example, IQ data as raw data (observed data) from the echoes.

A radar video creation apparatus 2 is an apparatus that performs an image production process on the raw data generated by the radar apparatus 1 and thereby creates a synthetic aperture radar image (hereinafter, referred to as "SAR image"), creates images for video from the SAR image, and plays back the video images.

The synthetic aperture radar image creating unit 11 performs processes of obtaining the raw data generated by the radar apparatus 1 and performing an image production process on the raw data to create the SAR image.

Note that possible options for the image production process include, for example, a backprojection algorithm, but any algorithm may be used as long as the SAR image can be created from the raw data.

A SAR, image storing unit 12 is configured with a storage apparatus, such as a RAM or hard disk, and stores the SAR image outputted from the synthetic aperture radar image creating unit 11.

Although here an example is shown in which raw data is transmitted from the radar apparatus 1 and the SAR image created from the raw data by the synthetic aperture radar image creating unit 11 is stored in the SAR image storing unit 12, when the radar apparatus 1 creates a SAR image from raw data and transmits the SAR image, the SAR image may be stored in the SAR image storing unit 12. Alternatively, a SAR image which is a product created in the past may be stored in the SAR image storing unit 12.

An azimuth Fourier transform unit 13 applies a Fourier transform on the SAR image stored in the SAR image storing unit 12 along an azimuth direction, to transform the SAR image into components in the Doppler frequency band. Note that the azimuth Fourier transform unit 13 is included in a first transform unit.

A band cutting-out unit 14 performs a process of cutting out a plurality of sub-band components from the components in the Doppler frequency band transformed by the azimuth Fourier transform unit 13.

An azimuth inverse Fourier transform unit 15 performs an inverse Fourier transform on the plurality of sub-band components which are cut out by the band cutting-out unit 14 along the azimuth direction, to transform the plurality of sub-band components into time-domain images, respectively. Note that the azimuth inverse Fourier transform unit 15 is included in a second transform unit.

An image reconstructing unit 16 performs processes of extracting, for each area irradiated with a beam by the radar apparatus 1, a pixel sequence corresponding to the irradiated area from each of the plurality of time-domain images transformed by the azimuth inverse Fourier transform unit 15, and gathering the plurality of extracted pixel sequences to construct images for the video.

A video image storing unit 17 is configured with a storage apparatus, e.g., a RAM or a hard disk, and stores the video images constructed by the image reconstructing unit 16 for the respective areas irradiated with a beam.

A video image playing-back unit 18 performs a process of playing back the plurality of video images in turn which are stored in the video image storing unit 17.

In the example of FIG. 1, it is assumed that each of the synthetic aperture radar image creating unit 11, the SAR image storing unit 12, the azimuth Fourier transform unit 13, the band cutting-out unit 14, the azimuth inverse Fourier transform unit 15, the image reconstructing unit 16, the video image storing unit 17, and the video image playing-back unit 18 which are components of the radar video creation apparatus 2 is implemented in dedicated hardware. Possible options for the hardware of the synthetic aperture radar image creating unit 11, the azimuth Fourier transform unit 13, the band cutting-out unit 14, the azimuth inverse Fourier transform unit 15, the image reconstructing unit 16, and the video image playing-back unit 18 include, for example, a semiconductor integrated circuit having mounted thereon a CPU and a one-chip microcomputer.

Note, however, that the radar video creation apparatus 2 of FIG. 1 is not limited to one in which each component is implemented in dedicated hardware, and the entire radar video creation apparatus 2 may be implemented with a computer.

Figure 11:
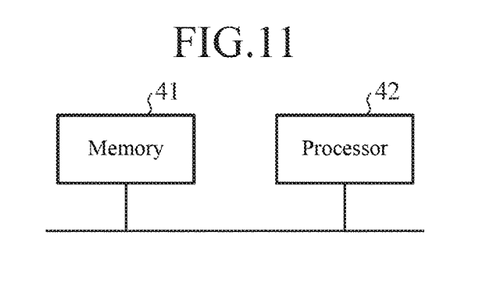
FIG. 11 is a hardware configuration diagram for a case in which the radar video creation apparatus is configured with a computer.

FIG. 11 is a hardware configuration diagram for a case in which the radar video creation apparatus 2 is implemented with a computer.

When the radar video creation apparatus 2 of FIG. 1 is implemented with a computer, the SAR image storing unit 12 and the video image storing unit 17 may be formed in a memory 41 of the computer, a program that describes the processing content of the synthetic aperture radar image creating unit 11, the azimuth Fourier transform unit 13, the band cutting-out unit 14, the azimuth inverse Fourier transform unit 15, the image reconstructing unit 16, and the video image playing-back unit 18 may be stored in the memory 41, and a processor 42 of the computer may execute the program stored in the memory 41.

Figure 2:
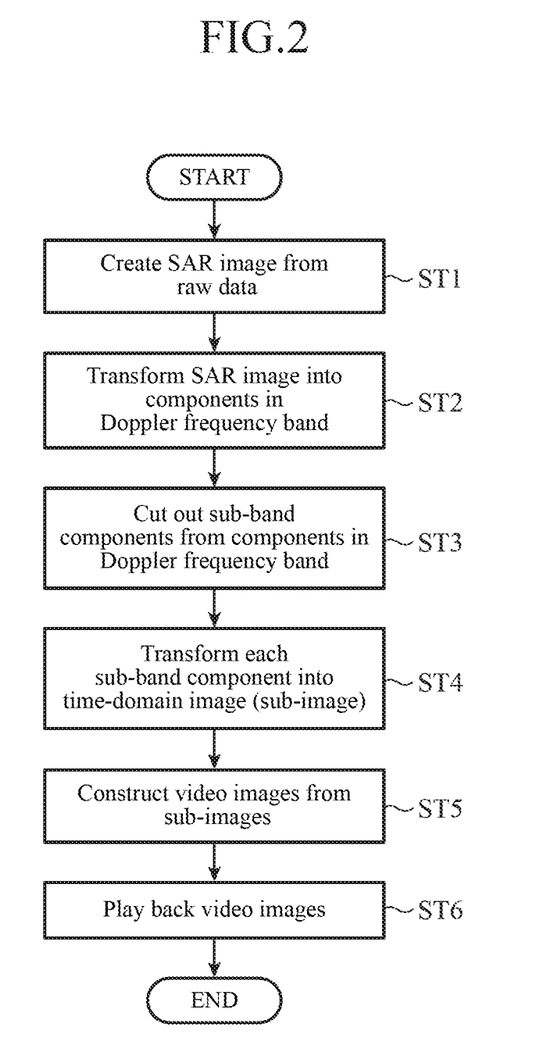
FIG. 2 is a flowchart showing a radar video creation method which is the processing content of the radar video creation apparatus according to Embodiment 1 of the invention.

FIG. 2 is a flowchart showing a radar video creation method which is the processing content of the radar video creation apparatus of Embodiment 1 of the invention.

The observation modes of the radar apparatus include a stripmap mode, a spotlight mode, and a sliding spotlight mode. The stripmap mode is characterized in that the direction of a beam to be irradiated from the radar apparatus on board a platform such as an aircraft is fixed and an area irradiated with a beam moves with the movement of the platform, and that a SAR image in a wide observation range can be obtained.

On the other hand, the spotlight mode is characterized in that observation is performed while changing the direction of a beam such that the center of an area irradiated with a beam always coincides with the center of an observed area. Since approximately the same observed area is kept irradiated with a beam, though the observation area of the SAR image to be obtained is narrow, the synthetic aperture angle can be made larger than that of the stripmap mode, and thus, a characteristic is exhibited that SAR images with high-resolution in the azimuth direction can be obtained.

The sliding spotlight mode will be described. In spotlight mode, the direction of a beam is changed such that the center of an area irradiated with a beam always coincides with the center of an observed area; on the other hand, the sliding spotlight mode is characterized in that, when it is assumed that a beam passes through the Earth, observation is performed while changing the direction of a beam such that the center of an area irradiated with a beam always captures one given point in the Earth. As a result, the synthetic aperture angle is made larger than that of the stripmap mode, improving the azimuth resolution, and the beam irradiation range is made wider than that of the spotlight mode, enabling to obtain a wide-area image. That is, the sliding spotlight mode is an observation mode having an intermediate performance between the stripmap mode and spotlight mode.

In Embodiment 1 an example in which the observation mode of the radar apparatus 1 is the stripmap mode or sliding spotlight mode is described.

Next, operations will be described.

Before specifically describing the content of the processing of the radar video creation apparatus of FIG. 1, the background of the processing will be described.

Figure 3A:
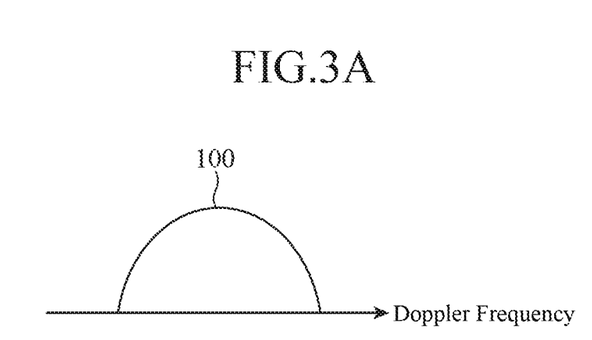
FIG. 3 is an illustrative diagram showing components in a Doppler frequency band into which a SAR image is transformed, and a beam pattern of a radar apparatus.
Figure 3B:
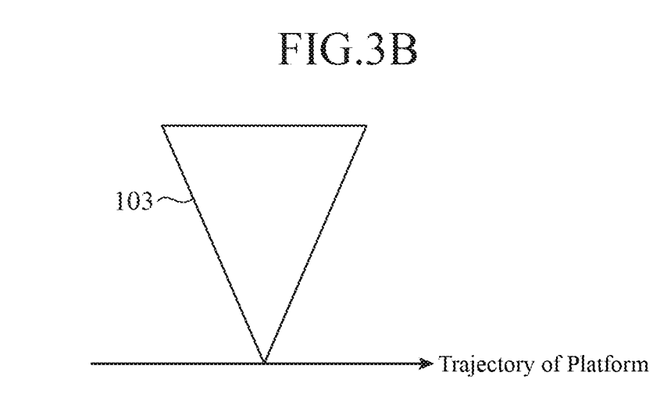

FIG. 3 is an illustrative diagram showing components in a Doppler frequency band into which a SAR image is transformed, and a beam pattern of the radar apparatus 1.

There is a correspondence between components 100 in a Doppler frequency band and a beam pattern 103 of the radar apparatus 1. As shown in FIG. 3, a forward direction of the beam pattern 103 corresponds to high Doppler frequency components, and a backward direction of the beam pattern 103 corresponds to low Doppler frequency components.

Figure 4:
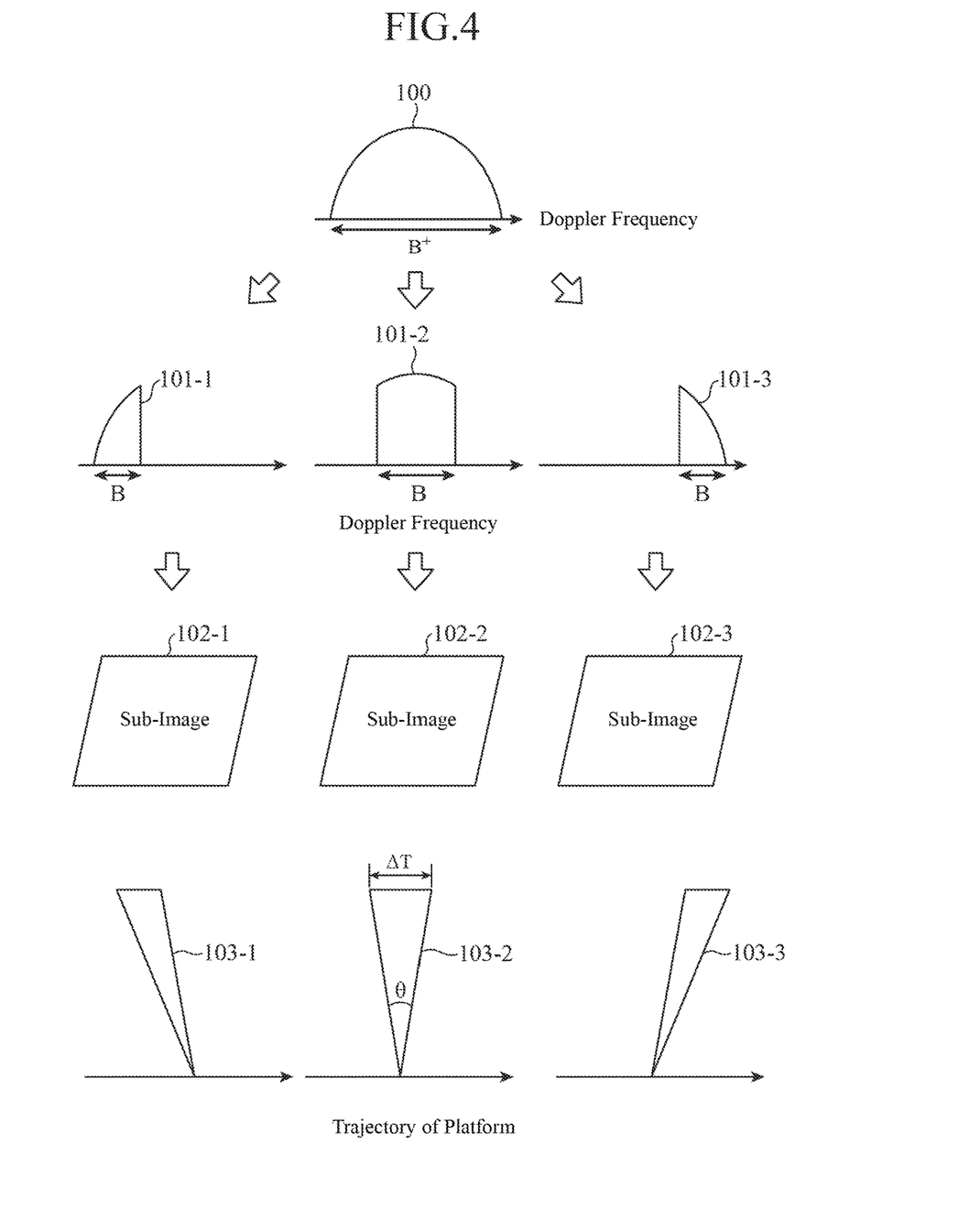
FIG. 4 is an illustrative diagram showing a state in which the components in the Doppler frequency band are divided into a plurality of sub-band components, using a stripmap mode with no beam squint, as an example.

FIG. 4 is an illustrative diagram showing a state in which the components in the Doppler frequency band are divided into a plurality of sub-band components, using the stripmap mode with no beam squint, as an example in order to describe correspondences between the components in the Doppler frequency band and beam irradiation directions.

When each of sub-band components 101-1 to 101-3 into which the components 100 in the Doppler frequency band are divided is transformed into the time domain, sub-images 102-1 to 102-3 which are time-domain images are obtained.

Here, since there is a correspondence between the components 100 in the Doppler frequency band and the beam pattern 103, the sub-image 102-1 corresponds to an image obtained by irradiation with a beam pattern 103-1 which is a divided pattern of the beam pattern 103, and the sub-image 102-2 corresponds to an image obtained by irradiation with a beam pattern 103-2 which is a divided pattern of the beam pattern 103.

In addition, the sub-image 102-3 corresponds to an image obtained by irradiation with a beam pattern 103-3 which is a divided pattern of the beam pattern 103.

Note, however, that the components 100 in the Doppler frequency band have a bandwidth $B^+$, but the sub-band components 101-1 to 101-3 have a bandwidth B and thus have a narrower bandwidth. Hence, attention is needed for the fact that the sub-images 102-1 to 102-3 are degraded in azimuth resolution and signal-to-noise power ratio over a SAR image from which the components 100 in the Doppler frequency band are transformed.

Next, the processing content of the radar video creation apparatus 2 of FIG. 1 will be specifically described.

Figure 5:
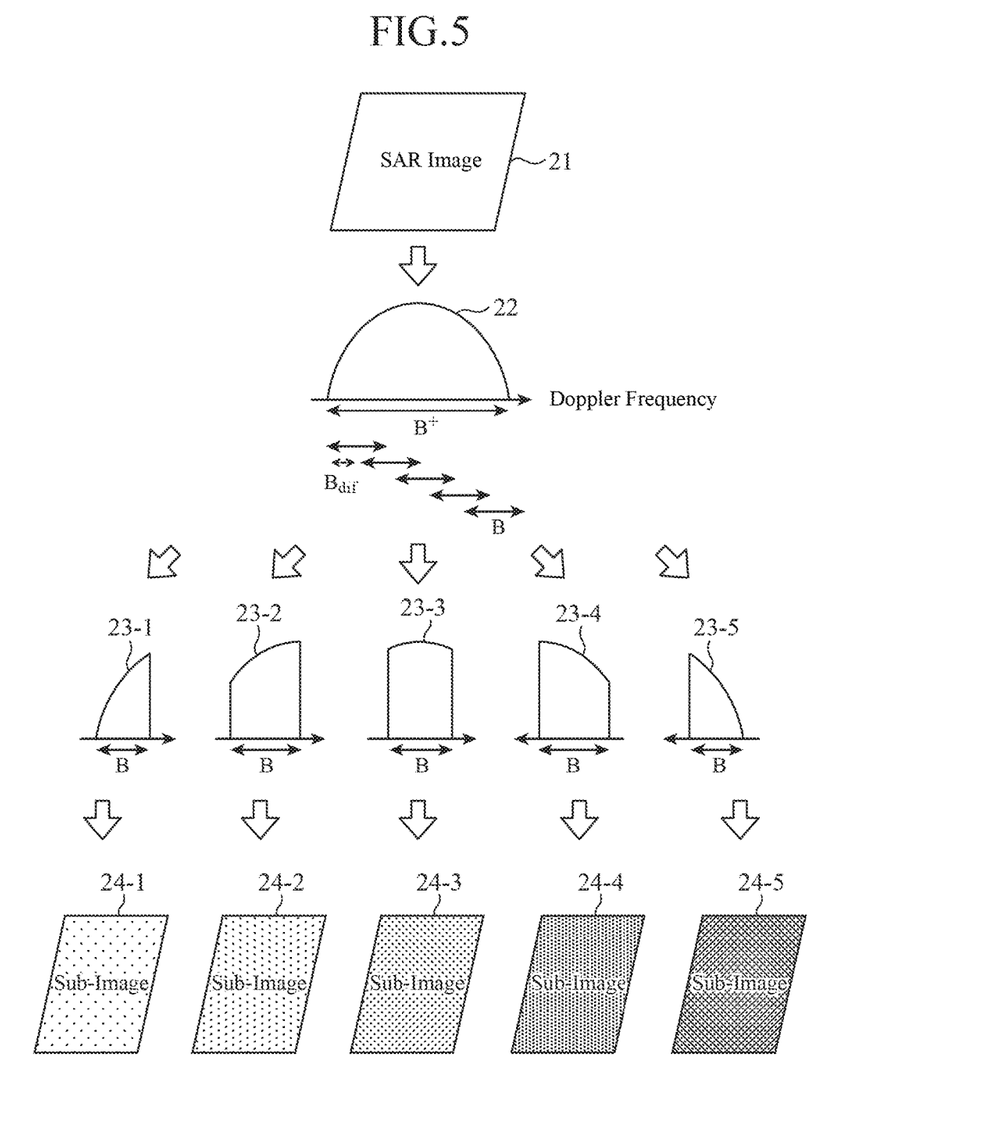
FIG. 5 is an illustrative diagram showing a part of the processing content of the radar video creation apparatus of FIG. 1.
Figure 6:
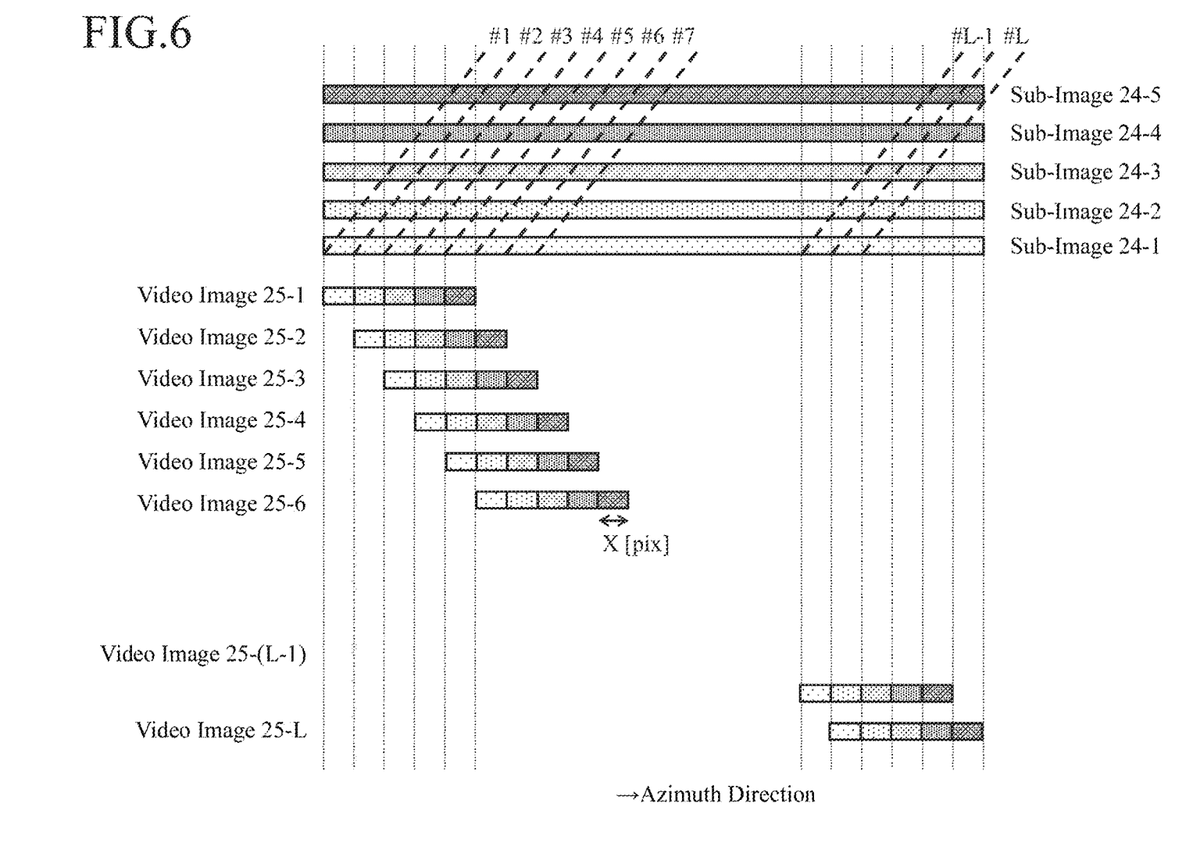
FIG. 6 is an illustrative diagram showing the processing content of an image reconstructing unit 16 of the radar video creation apparatus according to Embodiment 1 of the invention.

FIG. 5 is an illustrative diagram showing a part of the processing content of the radar video creation apparatus 2 of FIG. 1, and FIG. 6 is an illustrative diagram showing the processing content of the image reconstructing unit 16.

The radar apparatus 1 performs observation in stripmap mode or sliding spotlight mode, and transmits raw data which is the observed data to the radar video creation apparatus 2.

When the synthetic aperture radar image creating unit 11 of the radar video creation apparatus 2 receives the raw data from the radar apparatus 1, the synthetic aperture radar image creating unit 11 performs an image production process on the raw data and thereby creates a SAR image 21 (step ST1 of FIG. 2).

Although here an example is shown in which the SAR image 21 created by the synthetic aperture radar image creating unit 11 is stored in the SAR image storing unit 12, when, as described above, the radar apparatus 1 creates a SAR image 21 from the raw data and transmits the SAR image, the SAR image 21 may be stored in the SAR image storing unit 12. Alternatively, a SAR, image 21 which is a product created in the past may be stored in the SAR image storing unit 12.

The azimuth Fourier transform unit 13 applies a Fourier transform on the SAR image 21 stored in the SAR image storing unit 12 along the azimuth direction, and thereby transforms, as shown in FIG. 5, the SAR image 21 into components 22 in a Doppler frequency band (step ST2).

The components 22 in the Doppler frequency band exist according to the number of range bins. In FIG. 5, for convenience of description, focusing only on one dimension in the azimuth direction, only components for one range bin are depicted.

For a Fourier transform method, for example, fast Fourier transform (FFT) or discrete Fourier transform (DFT) can be used.

When the azimuth Fourier transform unit 13 transforms the SAR image 21 into the components 22 in the Doppler frequency band, the band cutting-out unit 14 performs a process of cutting out sub-band components 23-1 to 23-5 from the components 22 in the Doppler frequency band (step ST3). Note that when the components 22 in the Doppler frequency band having the bandwidth $B^+$ are not extracted from the bandwidth of a pulse repetition frequency in a Doppler frequency domain in the process of image production, the components 22 in the Doppler frequency band having the bandwidth $B^+$ are extracted from the bandwidth of the pulse repetition frequency, and then the process of cutting out the sub-band components 23-1 to 23-5 is performed.

FIG. 5 shows an example in which five sub-band components are cut out from the components 22 in the Doppler frequency band. Specifically, the sub-band components 23-1 to 23-5 having the bandwidth B are cut out from the components 22 in the Doppler frequency band having the bandwidth $B^+$, while shifting a bandwidth $B_{dif}$. Here, an example in which five sub-band components are cut out is shown, but needless to say, four or less or six or more sub-band components may be cut out.

In addition, by setting $B>B_{dif}$ as in FIG. 5 so that the frequency bands of adjacent sub-band components partially overlap each other, the advantageous effect of being able to smoothly check changes in an image can be obtained as in Patent Literature 1. However, it is not necessarily required to set $B>B_{dif}$ as in FIG. 5.

As with the components 22 in the Doppler frequency band, the sub-band components 23-1 to 23-5 exist according to the number of range bins. In FIG. 5, for convenience of description, focusing only on one dimension in the azimuth direction, only components for one range bin are depicted.

In addition, since the sub-band components 23-1 to 23-5 having the bandwidth B which is required to attain the azimuth resolution required for video are extracted, it is assumed that sub-images obtained from the sub-bands are not subjected to upsampling in the azimuth direction.

Here, an approximate value $\Delta T$ of the synthetic aperture time for the bandwidth B can be obtained, as shown in the following equations (1) and (2), from an approximate value $\theta$ of a synthetic aperture angle obtained from the bandwidth B:

$$\Delta T = \frac{2R}{v}\tan\left(\frac{\theta}{2}\right) \quad (1)$$

$$\theta = 2\arcsin\left(\frac{B\lambda}{4v}\right) \quad (2)$$

where $\lambda$ is the wavelength, v is the velocity of the platform, and R is the slant range distance.

In addition, as shown in equations (3) and (4) below, an approximate value $\Delta T_{dif}$ of an observation time difference among the sub-band components 23-1 to 23-5 for the bandwidth $B_{dif}$ can be computed from the bandwidth $B_{dif}$ which is the amount of shift among the sub-band components 23-1 to 23-5:

$$\Delta T_{dif} = \frac{2R}{v}\tan\left(\frac{\theta_{dif}}{2}\right) \quad (3)$$

$$\theta_{dif} = 2\arcsin\left(\frac{B_{dif}\lambda}{4v}\right) \quad (4)$$

Note that the azimuth resolution and signal-to-noise power ratio related to the image quality of video can be improved with a wider bandwidth B of the sub-band components 23-1 to 23-5 to be cut out by the band cutting-out unit 14. However, in the case of $B>B_{dif}$, an overlapping frequency band increases among the sub-band components 23-1 to 23-5, and thus, when the video is played back, the visibility of a moving target may degrade, e.g., it is difficult to see changes in an observed area or the target moving in the azimuth direction is observed in an extended manner in the azimuth direction.

Therefore, it is necessary to set the bandwidth B of the sub-band components 23-1 to 23-5 taking into account both the image quality of the video images and the visibility of changes in the video images.

When the band cutting-out unit 14 cuts out the sub-band components 23-1 to 23-5 from the components 22 in the Doppler frequency band, the azimuth inverse Fourier transform unit 15 respectively transforms the sub-band components 23-1 to 23-5 into sub-images 24-1 to 24-5 which are time-domain images by applying an inverse-Fourier-transform on the sub-band components 23-1 to 23-5 along the azimuth direction, as shown in FIG. 5 (step ST4).

The sub-images 24-1 to 24-5 are images whose observation times are shifted about $\Delta T_{dif}$ relative to each other, and the Doppler bandwidth of the sub-images 24-1 to 24-5 is B.

For an inverse Fourier transform method, for example, inverse fast Fourier transform (IFFT) or inverse discrete Fourier transform (IDFT) can be used.

In the sub-image 24-$k$ ($k=1, 2, \ldots, 5$), the number of samples in the azimuth direction is reduced by a factor of $B/B^+$ and the pixel spacing in the azimuth direction is increased by a factor of $B^+/B$ over the SAR image 21. The pixel spacing corresponds to the length per pixel.

Hence, the value obtained by multiplying the number of samples in the azimuth direction by the pixel spacing in the azimuth direction is the same between the SAR image 21 and the sub-image 24-$k$, and the observed areas of the SAR image 21 and the sub-image 24-$k$ match each other. Accordingly, the observed areas of the sub-images 24-1 to 24-5 also match each other.

However, when, after image production, both edge areas corresponding to one-half length of the synthetic aperture length in the azimuth direction are not removed and thus the SAR image 21 has areas with degraded azimuth resolution remaining at its both edges, an area that is not irradiated with a beam appears in the sub-image 24-$k$. Therefore, attention is needed for the fact that, when the SAR image 21 has areas with degraded azimuth resolution remaining at its both edges, an area to be observed does not match between the SAR image 21 and the sub-image 24-$k$ in a sense that a target cannot be checked because the areas are not irradiated with a beam.

Here, although the azimuth inverse Fourier transform unit 15 obtains the sub-images 24-1 to 24-5, to improve the visibility of the sub-images 24-1 to 24-5 and/or reduce the number of pixels in creating video, processes for achieving high image quality by performing, for each sub-image 24-$k$, a moving average on the power value of pixels forming the sub-image 24-$k$, bringing back the dimension into the amplitude one, and carrying out sampling, or a process of reducing the number of data points may be added.

The sub-images 24-1 to 24-5 obtained by the azimuth inverse Fourier transform unit 15 are, as shown in FIG. 4, images obtained by separating signal components for each beam irradiation direction of the radar apparatus 1, and are shifted in observation time by about $\Delta T_{dif}$ relative to each other.

The pixel spacing $\Delta a$ in the azimuth direction of the sub-image 24-$k$ ($k=1, 2, \ldots, 5$) for when a thinning-out process is not performed is represented as shown in the following equation (5):

$$\Delta a = \frac{v}{B} \quad (5)$$

When a thinning-out process is performed on the sub-image 24-$k$ to reduce the number of data points in the azimuth direction by a factor of $1/Z$, the value obtained by multiplying $\Delta a$ in equation (5) by Z is the pixel spacing in the azimuth direction.

As shown in FIG. 6, the image reconstructing unit 16 extracts, for each area #I (#I=#1, #2, \ldots, #L) irradiated with a beam by the radar apparatus 1, a pixel sequence corresponding to the irradiated area #I from the sub-images 24-1 to 24-5 transformed by the azimuth inverse Fourier transform unit 15, and collects the extracted pixel sequences to construct video images 25-I (I=1, 2, \ldots, L) (step ST5).

A process of constructing video images 25-I (I=1, 2, ..., L) by the image reconstructing unit 16 will be specifically described below.

For example, when I=1, a pixel sequence in the azimuth direction X(I−1)+1 to X(I−1)+X [pix] is extracted from the sub-image 24-1.

Here, X=floor (v×$\Delta T_{dif}$/$\Delta a$).

The symbol, floor( ), is the symbol of operation indicating the extraction of the integer part of v×$\Delta T_{dif}$/$\Delta a$.

Then, a pixel sequence in the azimuth direction X(I−1)+X+1 to X(I−1)+2X [pix] is extracted from the sub-image 24-2.

Likewise, a pixel sequence in the azimuth direction X(I−1)+(k−1)X+1 to X(I−1)+kX [pix] is extracted from the sub-image 24-k (k=3, 4, and 5).

When the image reconstructing unit 16 extracts a pixel sequence for the irradiated area #I=1 from each of the sub-images 24-1 to 24-5, as shown in FIG. 6, the image reconstructing unit 16 collects the pixel sequences and thereby constructs a video image 25-1. The video image 25-1 is an image which is a pseudo-production version of an image obtained by performing, by the radar apparatus 1, beam irradiation with synthetic aperture time corresponding to $\Delta T$ seconds and performing an image production process.

In the case of I=2, ..., L, too, as in the case of I=1, the image reconstructing unit 16 extracts a pixel sequence for the irradiated area 41 from each of the sub-images 24-1 to 24-5, and collects the pixel sequences and thereby constructs video images 25-I (I=2, 3, ..., L).

When the image reconstructing unit 16 constructs the video images 25-1 to 25-L, the image reconstructing unit 16 stores the video images 25-1 to 25-L in the video image storing unit 17.

The video image playing-back unit 18 reads the video images 25-1 to 25-L from the video image storing unit 17, and plays back the video images 25-1 to 25-L in the order of the video images 25-1->25-2->25-3-> . . . ->25-L (step ST6).

By this, a situation where an observed area is changing every moment with the movement of the platform having the radar apparatus 1 on board is reproduced. Hence, changes in the motion of a moving target or in the tide of the sea can be checked.

Note that about $\Delta T_{dif}$ is present among the sub-band components 23-1 to 23-5 as an observation time difference, and thus, when the video image playing-back unit 18 plays back the video images 25-1 to 25-L, the video image playing—back unit 18 calculates an approximate value $\Delta T_{dif}$ of the observation time difference using the above-described equations (3) and (4), and determines a frame rate to be used when playing back the video images 25-1 to 25-L, from the inverse of the approximate value $\Delta T_{dif}$ of the observation time difference. For example, the frame rate to be used when the video images 25-1 to 25-L are played back is matched with the inverse of the approximate value $\Delta T_{dif}$ of the observation time difference.

By this, the actual velocity of a moving target in the video can be checked. By thus setting $B_{dif}$ with reference to the frame rate, the video can be checked at any playback speed.

As is clear from the above, according to Embodiment 1, there are provided the azimuth Fourier transform unit 13 that Fourier-transforms a SAR image 21 in the azimuth direction which is stored in the SAR image storing unit 12, and thereby transforms the SAR image 21 into components 22 in a Doppler frequency band; the band cutting-out unit 14 that cuts out sub-band components 23-1 to 23-5 from the components 22 in the Doppler frequency band transformed by the azimuth Fourier transform unit 13; and the azimuth inverse Fourier transform unit 15 that inverse-Fourier-transforms the sub-band components 23-1 to 23-5 in the azimuth direction which are cut out by the band cutting-out unit 14, and thereby transforms the sub-band components 23-1 to 23-5 into sub-images 24-1 to 24-5, respectively, which are time-domain images, and the image reconstructing unit 16 extracts, for each area #1 irradiated with a beam by the radar apparatus I (#I=#1, #2, ..., #L), a pixel sequence corresponding to the irradiated area #I from each of the sub-images 24-1 to 24-5 transformed by the azimuth inverse Fourier transform unit 15, and collects the plurality of extracted pixel sequences to construct video images 25-I (I=1, 2, ..., L). Thus, the advantageous effect of being able to create video images 25-1 to 25-L from the SAR, image 21 is provided.

Therefore, it becomes possible to handle, for example, a request to create, on a platform 3, a SAR image 21 from raw data obtained by the radar apparatus 1 and transmit the SAR image 21 to the radar video creation apparatus 2, instead of transmitting raw data with a large amount of data to the radar video creation apparatus 2, for the purpose of reducing the amount of communication, and create video images 25-1 to 25-L from the SAR image 21, and a request to create video images 25-1 to 25-L from a SAR image 21 which is a product created in the past.

Figure 7:
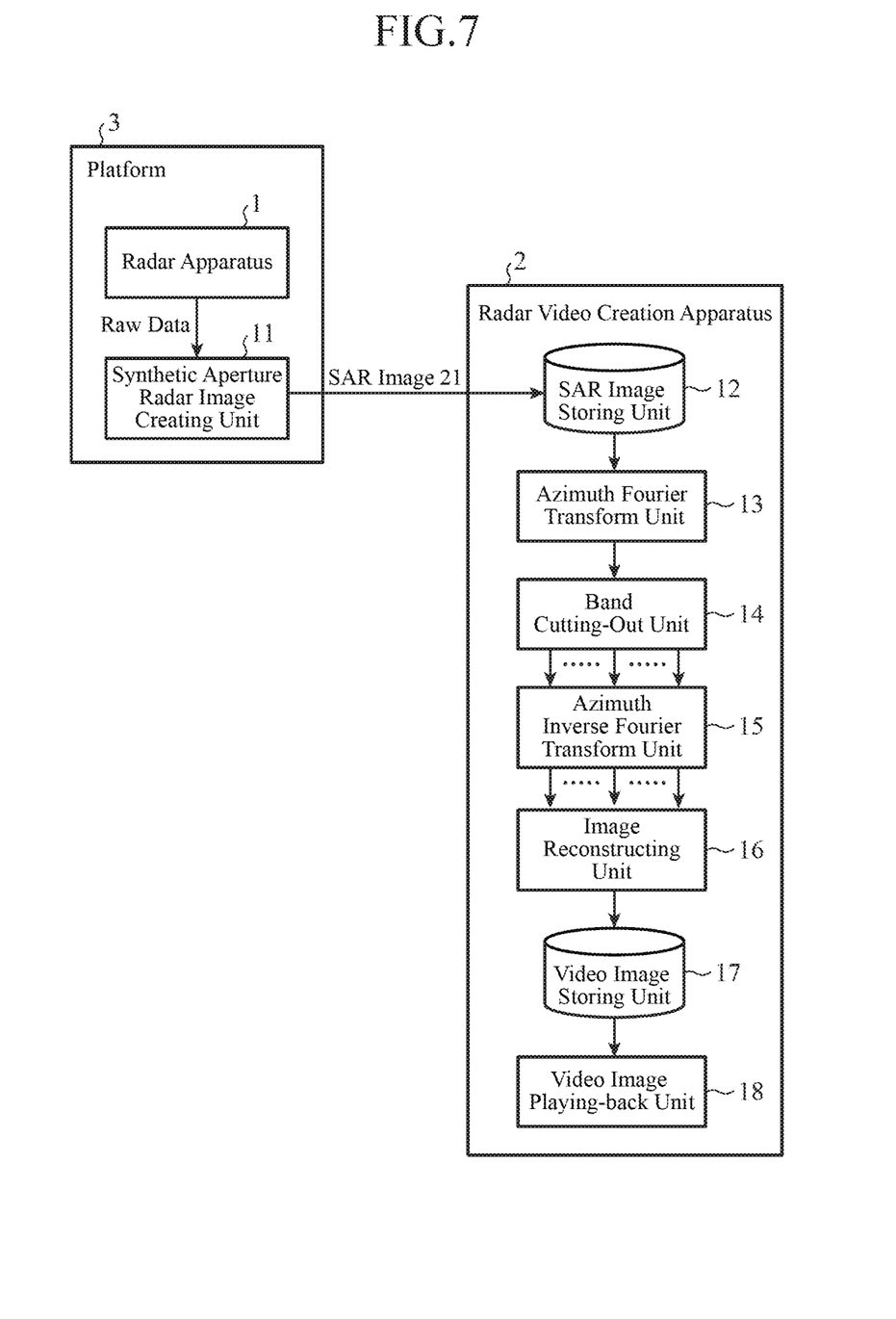
FIG. 7 is a configuration diagram showing another radar video creation apparatus according to Embodiment 1 of the invention.

Here, FIG. 7 is a configuration diagram showing a radar video creation apparatus 2 for a case in which a platform 3 having mounted thereon a radar apparatus transmits a SAR image 21. In the configuration of FIG. 7, a synthetic aperture radar image creating unit 11 is mounted on the platform 3.

In the example of FIG. 1, the synthetic aperture radar image creating unit 11 is mounted so that a case in which raw data is transmitted from the radar apparatus 1 can also be handled; however, when transmission of raw data from the radar apparatus 1 is not expected and the process is always limited to the creation of video images 25-1 to 25-L from a SAR image 21, the synthetic aperture radar image creating unit 11 can be omitted.

In addition, since the SAR image 21 stored in the SAR image storing unit 12 corresponds to one that is created from raw data observed in stripmap mode or sliding spotlight mode by the radar apparatus 1, the advantageous effect of being able to create video images for a case of performing observation in an observation mode, the stripmap mode or sliding spotlight mode, is provided. In addition, a SAR image 21 obtained by bistatic observation can also be handled.

In addition, in Embodiment 1, by setting B>$B_{dif}$, the band cutting-out unit 14 is configured to cut out sub-band components 23-1 to 23-5 from components 22 in a Doppler frequency band which are transformed by the azimuth Fourier transform unit 13, such that the frequency bands of adjacent sub-band components partially overlap each other. Thus, the advantageous effect of being able to create video images 25-1 to 25-L that smoothly change is provided.

Embodiment 2

The above-described Embodiment 1 shows the radar video creation apparatus 2 that can be used in an observation mode of stripmap mode or sliding spotlight mode. In Embodiment 2, a radar video creation apparatus 32 that can be used in an observation mode of spotlight mode will be described.

Figure 8:
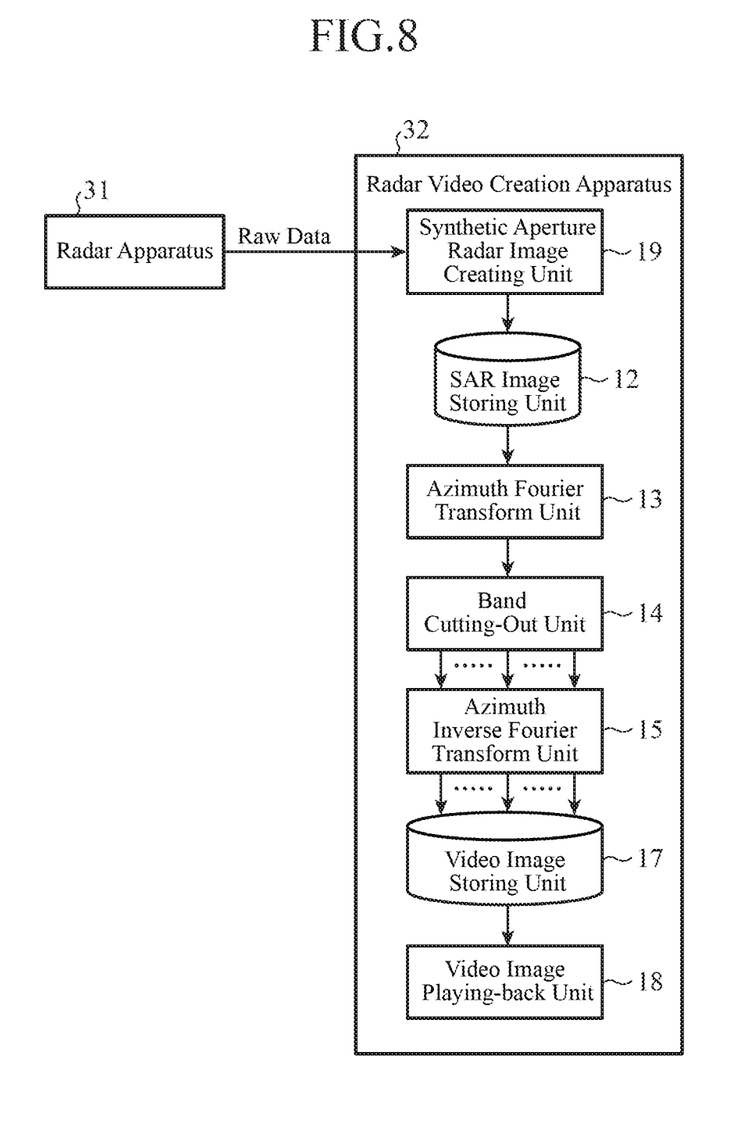
FIG. 8 is a configuration diagram showing a radar video creation apparatus according to Embodiment 2 of the invention.

FIG. 8 is a configuration diagram showing a radar video creation apparatus according to Embodiment 2 of the invention. In FIG. 8, the same reference signs as those in FIG. 1 indicate the same or corresponding portions and thus description thereof is omitted.

A radar apparatus 31 is a radar that performs observation in spotlight mode. For example, the radar apparatus 31 irradiates a target on the Earth's surface with a beam and then receives echoes from the target and generates, for example, IQ data as raw data (observed data) from the echoes.

The radar video creation apparatus 32 is an apparatus that performs an image production process on the raw data generated by the radar apparatus 31 and thereby creates a SAR image, creates video images from the SAR image, and plays back the video images.

In the case of the spotlight mode, since an area on the Earth's surface to be irradiated with a beam by the radar apparatus 31 is fixed, the image reconstructing unit 16 of FIG. 1 is not required.

A synthetic aperture radar image creating unit 19 performs processes of obtaining the raw data generated by the radar apparatus 31 and performing an image production process on the raw data to create a SAR image.

Note that possible options for the image production process include, for example, a backprojection algorithm, but any algorithm may be used as long as a SAR image can be created from raw data.

In the example of FIG. 8, it is assumed that each of the synthetic aperture radar image creating unit 19, a SAR image storing unit 12, an azimuth Fourier transform unit 13, a band cutting-out unit 14, an azimuth inverse Fourier transform unit 15, a video image storing unit 17, and a video image playing-back unit 18 which are the components of the radar video creation apparatus 32 is implemented in dedicated hardware. Possible options for the hardware of the synthetic aperture radar image creating unit 19, the azimuth Fourier transform unit 13, the band cutting-out unit 14, the azimuth inverse Fourier transform unit 15, and the video image playing-back unit 18 include, for example, a semiconductor integrated circuit having mounted thereon a CPU and a one-chip microcomputer.

Note, however, that the radar video creation apparatus 32 of FIG. 8 is not limited to one in which each component is implemented in dedicated hardware, and the entire radar video creation apparatus 32 may be implemented with a computer.

When the radar video creation apparatus 32 of FIG. 8 is implemented with a computer, the SAR image storing unit 12 and the video image storing unit 17 are formed in the memory 41 of the computer shown in FIG. 11, and a program that describes the processing content of the synthetic aperture radar image creating unit 19, the azimuth Fourier transform unit 13, the band cutting-out unit 14, the azimuth inverse Fourier transform unit 15, and the video image playing-back unit 18 is stored in the memory 41, and the processor 42 of the computer executes the program stored in the memory 41.

Figure 9:
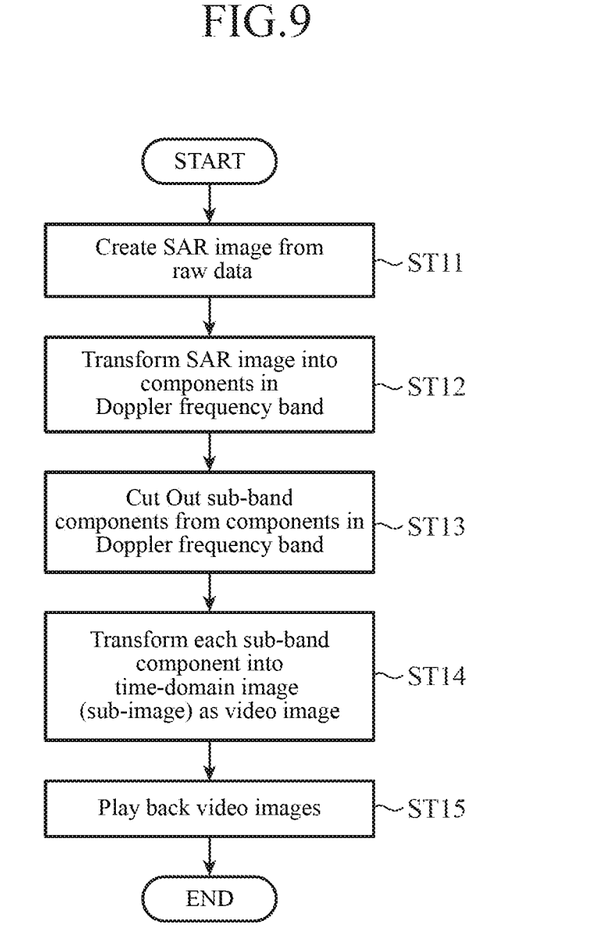
FIG. 9 is a flowchart showing a radar video creation method which is the processing content of the radar video creation apparatus according to Embodiment 2 of the invention.

FIG. 9 is a flowchart showing a radar video creation method which is the processing content of the radar video creation apparatus according to Embodiment 2 of the invention.

Next, operations will be described.

The radar apparatus 31 performs observation in spotlight mode and transmits raw data which is the observed data to the radar video creation apparatus 32.

When the synthetic aperture radar image creating unit 19 of the radar video creation apparatus 32 receives the raw data from the radar apparatus 31, the synthetic aperture radar image creating unit 19 performs an image production process on the raw data and thereby creates a SAR image 21 (step ST11 of FIG. 9).

Although here an example is shown in which the SAR image 21 created by the synthetic aperture radar image creating unit 19 is stored in the SAR image storing unit 12, when the radar apparatus 31 creates a SAR image 21 from the raw data and transmits the SAR image 21, the SAR image 21 may be stored in the SAR image storing unit 12. Alternatively, a SAR image 21 which is a product created in the past may be stored in the SAR image storing unit 12.

As in Embodiment 1 described above, the azimuth Fourier transform unit 13 applies a Fourier-transform on the SAR image 21 stored in the SAR image storing unit 12 along the azimuth direction, and thereby transforms, as shown in FIG. 5, the SAR image 21 into components 22 in a Doppler frequency band (step ST12).

The components 22 in the Doppler frequency band exist according to the number of range bins. In FIG. 5, for convenience of description, focusing only on one dimension in the azimuth direction, only components for one range bin are depicted.

When the azimuth Fourier transform unit 13 transforms the SAR image 21 into the components 22 in the Doppler frequency band, as in the above-described Embodiment 1, the band cutting-out unit 14 performs a process of cutting out sub-band components 23-1 to 23-5 from the components 22 in the Doppler frequency band (step ST13).

FIG. 5 shows an example in which five sub-band components are cut out from the components 22 in the Doppler frequency band. Specifically, the sub-band components 23-1 to 23-5 having a bandwidth B are cut out from the components 22 in the Doppler frequency band having a bandwidth $B^+$, while shifting a bandwidth $B_{dif}$.

As with the components 22 in the Doppler frequency band, the sub-band components 23-1 to 23-5 exist according to the number of range bins. In FIG. 5, for convenience of description, focusing only on one dimension in the azimuth direction, only components for one range bin are depicted.

When the band cutting-out unit 14 cuts out the sub-band components 23-1 to 23-5 from the components 22 in the Doppler frequency band, as in the above-described Embodiment 1, the azimuth inverse Fourier transform unit 15 applies an inverse-Fourier-transform on the sub-band components 23-1 to 23-5 along the azimuth direction and thereby transforms, as shown in FIG. 5, the sub-band components 23-1 to 23-5 into sub-images 24-1 to 24-5, respectively, which are time-domain images (step ST14).

The sub-images 24-1 to 24-5 are images whose observation times are shifted about $\Delta T_{dif}$ relative to each other, and the Doppler bandwidth of the sub-images 24-1 to 24-5 is B.

When the observation mode of the radar apparatus 31 is the spotlight mode, even if a platform having the radar apparatus 31 on board moves, an area irradiated with a beam at each observation time does not change. Thus, the image reconstructing unit 16 does not need to construct video images 25-1 to 25-L from the sub-images 24-1 to 24-5 like the above-described Embodiment 1, and the sub-images 24-1 to 24-5 can be used as video images.

The video image storing unit 17 stores the sub-images 24-1 to 24-5 as video images.

The video image playing-back unit 18 reads the sub-images 24-1 to 24-5 as video images from the video image storing unit 17, and plays back the sub-images 24-1 to 24-5 in the order of the sub-images 24-1->24-2-> . . . ->24-5 (step ST15).

Note that about $\Delta T_{dif}$ is present among the sub-band components 23-1 to 23-5 as an observation time difference, and thus, when the video image playing-back unit 18 plays back the sub-images 24-1 to 24-5 as video images, the video image playing-back unit 18 calculates an approximate value $\Delta T_{dif}$ of the observation time difference using equations (3) and (4) described above, and determines a frame rate to be used when playing back the sub-images 24-1 to 24-5, from the inverse of the approximate value $\Delta T_{dif}$ of the observation time difference. For example, the frame rate used when the sub-images 24-1 to 24-5 are played back is matched with the inverse of the approximate value $\Delta T_{dif}$ of the observation time difference.

By this, the actual velocity of a moving target in the video can be checked. By thus setting $B_{dif}$ with reference to the frame rate, the video can be checked at an any playback speed.

As is clear from the above, according to Embodiment 2, it is configured to provide the azimuth Fourier transform unit 13 that applies a Fourier-transform on a SAR image 21 stored in the SAR image storing unit 12 along the azimuth direction, and thereby transforms the SAR image 21 into components 22 in a Doppler frequency band; the band cutting-out unit 14 that cuts out sub-band components 23-1 to 23-5 from the components 22 in the Doppler frequency band transformed by the azimuth Fourier transform unit 13; and the azimuth inverse Fourier transform unit 15 that applies an inverse-Fourier-transform on the sub-band components 23-1 to 23-5 in the azimuth direction which are cut out by the band cutting-out unit 14, and thereby transforms the sub-band components 23-1 to 23-5 into sub-images 24-1 to 24-5 as video images, respectively, the sub-images 24-1 to 24-5 being time-domain images. Thus, the advantageous effect of being able to create the sub-images 24-1 to 24-5 as video images from the SAR image 21 is provided.

Therefore, it becomes possible to meet, for example, a request to create, on a platform 3, a SAR image 21 from raw data obtained by the radar apparatus 31 and transmit the SAR image 21 to the radar video creation apparatus 32, instead of transmitting raw data with a large amount of data to the radar video creation apparatus 32, for the purpose of reducing the amount of communication, and create video images 25-1 to 25-L from the SAR image 21, and a request to create video images 25-1 to 25-L from a SAR image 21 which is a product created in the past.

Figure 10:
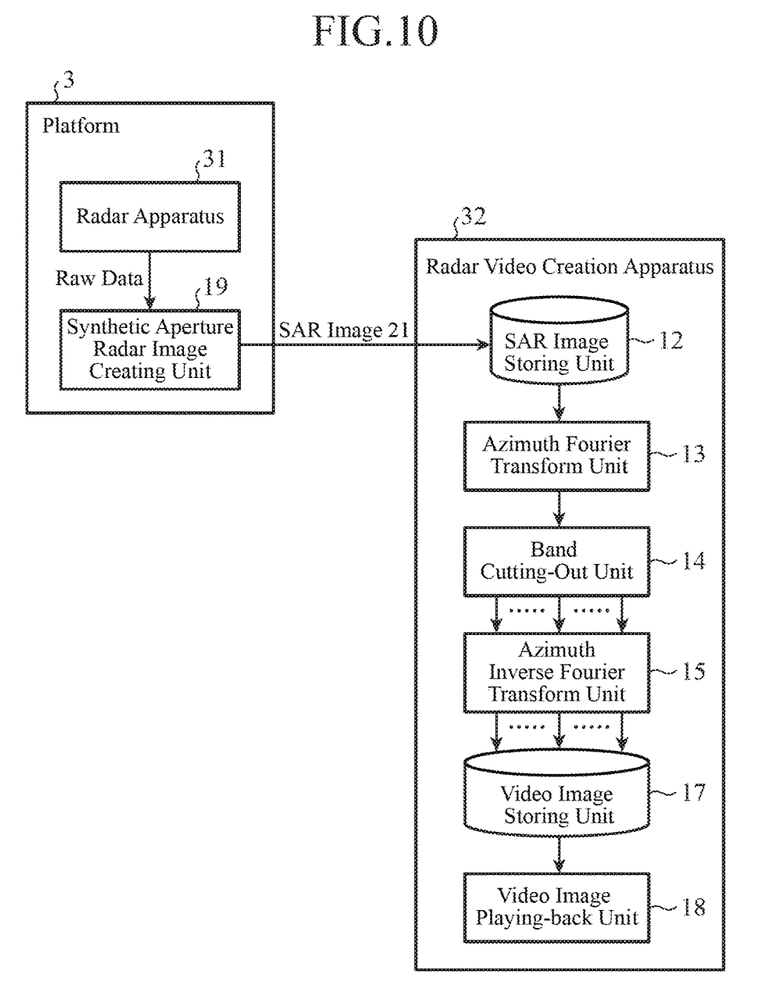
FIG. 10 is a configuration diagram showing another radar video creation apparatus according to Embodiment 2 of the invention.

Here, FIG. 10 is a configuration diagram showing a radar video creation apparatus 32 for a case in which a platform 3 having mounted thereon a radar apparatus 31 transmits a SAR image 21. In the configuration of FIG. 10, a synthetic aperture radar image creating unit 19 mounted on the platform 3.

In the example of FIG. 8, the synthetic aperture radar image creating unit 19 is mounted so that a case in which raw data is transmitted from the radar apparatus 31 can also be addressed; however, when transmission of raw data from the radar apparatus 31 is not expected and the process is always limited to the creation of video images 25-1 to 25-L from a SAR image 21, the synthetic aperture radar image creating unit 19 can be omitted.

In addition, in Embodiment 2, a SAR image 21 obtained by bistatic observation can also be handled.

In addition, in Embodiment 2, by setting $B>B_{dif}$, the band cutting-out unit 14 is configured to cut out sub-band components 23-1 to 23-5 from components 22 in a Doppler frequency band which are transformed by the azimuth Fourier transform unit 13, such that the frequency bands of adjacent sub-band components partially overlap each other.

Thus, the same advantageous effect as that of Patent Literature 1 is provided, i.e., the advantageous effect of being able to create sub-images 24-1 to 24-5 as video images that smoothly change. The image production process by the synthetic aperture radar image creating unit 19 of the radar video creation apparatus 32 does not include a redundant image production process for the overlapping portions, and thus, despite the fact that an equivalent advantageous effect to that of Patent Literature 1 can be obtained, an advantageous effect of a reduction in the amount of computation can also be obtained.

Note that free combinations of the embodiments, modifications to any component in the embodiments, or omissions of any component in the embodiments may be made within the scope of the invention of this application.

INDUSTRIAL APPLICABILITY

In a radar video creation apparatus and method according to the invention, a synthetic aperture radar image created from observed data of a radar apparatus is transformed into components in a Doppler frequency band; a plurality of sub-band components are cut out from the transformed components in the Doppler frequency band; the plurality of cut-out sub-band components are transformed into time-domain images, respectively; for each area irradiated with a beam by the radar apparatus, a pixel sequence corresponding to the irradiated area is extracted from each of the plurality of transformed time-domain images; and the plurality of extracted pixel sequences are gathered to construct a video image. Thus, the radar video creation apparatus and method can create video images from a synthetic aperture radar image and are suitable to create a radar video.

REFERENCE SIGNS LIST

1: Radar apparatus, 2: Radar video creation apparatus, 3: Platform, 11: Synthetic aperture radar image creating unit, 12: SAR image storing unit, 13: Azimuth Fourier transform unit (first transform unit), 14: Band cutting-out unit, 15: Azimuth inverse Fourier transform unit (second transform unit), 16: Image reconstructing unit, 17: Video image storing unit, 18: Video image playing-back unit, 19: Synthetic aperture radar image creating unit, 21: SAR image, 22: Components in Doppler frequency band, 23-1 to 23-5: Sub-band components, 24-1 to 24-5: Sub-images, 25-1 to 25-L: Video images, 31: Radar apparatus, 32: Radar video creation apparatus, 41: Memory, 42: Processor, 100: Components in Doppler frequency band, 101-1 to 101-3: Sub-band components, 102-1 to 102-3: Sub-images, 103: Beam pattern, and 103-1 to 103-3: Divided beam pattern

The invention claimed is:
1. A radar video creation apparatus comprising:
a processor to execute a program; and
a memory to store the program which, when executed by the processor, performs processes of:
transforming a synthetic aperture radar image into components in a Doppler frequency band, the synthetic aperture radar image being created from observed data of a radar apparatus;
cutting out a plurality of series of sub-band components from the transformed components in the Doppler frequency band;
respectively transforming the cut-out plurality of series of sub-band components into a plurality of time-domain images;

extracting, for each area irradiated with a beam by the radar apparatus, a pixel sequence corresponding to the irradiated area from each of the transformed plurality of time-domain images, and collecting the plurality of extracted pixel sequences to construct images for video; and playing back the images for video in turn, the images for video being constructed for the respective areas irradiated with a beam, wherein the processor calculates from a bandwidth of the sub-band components an observation time difference between adjacent sub-band components, and determines a frame rate from an inverse of the observation time difference for use in playing back the images for video.

2. The radar video creation apparatus according to claim 1, wherein the processor creates a synthetic aperture radar image by performing a synthetic aperture process on data, and outputs the synthetic aperture radar image for the process of transforming the synthetic aperture radar image, the data being observed in stripmap mode or sliding spotlight mode by the radar apparatus.

3. The radar video creation apparatus according to claim 1, wherein the processor cuts out the plurality of series of sub-band components from the components in the Doppler frequency band transformed in such a manner that frequency bands of the adjacent sub-band components partially overlap each other.

4. A radar video creation apparatus comprising:
a processor to execute a program; and
a memory to store the program which, when executed by the processor, performs processes of:
transforming a synthetic aperture radar image into components in a Doppler frequency band, the synthetic aperture radar image being created from observed data of a radar apparatus;
cutting out a plurality of series of sub-band components from the transformed components in the Doppler frequency band;
respectively transforming the cut-out plurality of series of sub-band components into a plurality of time-domain images as images for video; and
playing back the images for video in turn, the images for video being the transformed plurality of time-domain images,
wherein the processor calculates from a bandwidth of the sub-band components an observation time difference between adjacent sub-band components, and determines a frame rate from an inverse of the observation time difference for use in playing back the images for video.

5. The radar video creation apparatus according to claim 4, wherein the processor creates a synthetic aperture radar image by performing a synthetic aperture process on data, and outputs the synthetic aperture radar image for the process of transforming the synthetic aperture radar image, the data being observed in spotlight mode by the radar apparatus.

6. The radar video creation apparatus according to claim 4, wherein the processor cuts out the plurality of series of sub-band components from the components in the Doppler frequency band transformed in such a manner that frequency bands of the adjacent sub-band components partially overlap each other.

7. A radar video creation method comprising:
transforming a synthetic aperture radar image into components in a Doppler frequency band, the synthetic aperture radar image being created from observed data of a radar apparatus;
cutting out a plurality of series of sub-band components from the transformed components in the Doppler frequency band;
transforming the cut-out plurality of series of sub-band components into a plurality of time-domain images, respectively;
extracting, for each area irradiated with a beam by the radar apparatus, a pixel sequence corresponding to the irradiated area from each of the transformed plurality of time-domain images, and collecting the plurality of extracted pixel sequences to construct images for video; and
playing back the images for video in turn, the images for video being the transformed plurality of time-domain images, wherein an observation time difference between adjacent sub-band components are calculated from a bandwidth of the sub-band components, and a frame rate is determined from an inverse of the observation time difference for use in playing back the images for video.

8. A radar video creation method comprising:
transforming a synthetic aperture radar image into components in a Doppler frequency band, the synthetic aperture radar image being created from observed data of a radar apparatus;
cutting out a plurality of series of sub-band components from the transformed components in the Doppler frequency band;
transforming the cut-out plurality of series of sub-band components into a plurality of time-domain images as images for video, respectively; and
playing back the images for video in turn, the images for video being the transformed plurality of time-domain images, wherein an observation time difference between adjacent sub-band components are calculated from a bandwidth of the sub-band components, and a frame rate is determined from an inverse of the observation time difference for use in playing back the images for video.

* * * * *